US012812214B2

(12) United States Patent
Delépine et al.

(10) Patent No.: US 12,812,214 B2
(45) **Date of Patent: *Nov. 24, 2026**

(54) SYSTEMS AND METHODS FOR PROVIDING PLAY CONTEXT RECOGNITION USING ULTRASOUND CODES

(71) Applicant: Spotify AB, Stockholm (SE)

(72) Inventors: Victor Delépine, Brooklyn, NY (US); Ryan Clough, Brooklyn, NY (US); Samuel Ngahane, Brooklyn, NY (US); Carlos Rodriguez Castillo, Brooklyn, NY (US); Peter Milan Thomson Sobot, Brooklyn, NY (US)

(73) Assignee: Spotify AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/930,998

(22) Filed: Oct. 29, 2024

(65) Prior Publication Data

US 2025/0056095 A1 Feb. 13, 2025

Related U.S. Application Data

(63) Continuation of application No. 17/001,028, filed on Aug. 24, 2020, now Pat. No. 12,167,095.

(51) Int. Cl.
*H04N 7/18* (2006.01)
*G06F 21/16* (2013.01)
(Continued)

(52) U.S. Cl.
CPC ......... *H04N 21/4722* (2013.01); *G06F 21/16* (2013.01); *H04N 21/8358* (2013.01)

(58) Field of Classification Search
CPC ........... H04N 21/4722; H04N 21/8358; H04N 21/43637; H04N 21/4126; G06F 21/16;
(Continued)

(56) References Cited

U.S. PATENT DOCUMENTS 5,889,870 A 3/1999 Norris
8,140,258 B1 3/2012 Dempsey
(Continued)

FOREIGN PATENT DOCUMENTS

WO 2007107982 9/2007

OTHER PUBLICATIONS

Jiang, et al., "Ultrasonic Wireless Communication in Air using OFDM-OOK Modulation," 2014 IEEE Int'l Unltrasonic Symposium Proceedings, pp. 1025-1028.
(Continued)

*Primary Examiner* — Annan Q Shang
(74) *Attorney, Agent, or Firm* — McDonnell Boehnen Hulbert & Berghoff LLP

(57) ABSTRACT

Systems, methods and computer products are provided for retrieving play context. Media content associated with the media content is transmitted over a network. A first media playback device broadcasts an ultrasound code to one or more second media playback devices, where the ultrasound code corresponds to a play context code. The play context code is obtained from a second media playback device and in response the second media playback device receives a play context based on the play context code.

20 Claims, 6 Drawing Sheets

(51) Int. Cl.
*H04N 21/4722* (2011.01)
*H04N 21/8358* (2011.01)

(58) Field of Classification Search
CPC ..... H04B 11/00; H04L 67/125; H04L 67/142; H04L 67/146
See application file for complete search history.

(56) References Cited

U.S. PATENT DOCUMENTS

| | | | | |
|---|---|---|---|---|
| 10,546,590 | B2 | 1/2020 | Sharma et al. | |
| 10,777,177 | B1 | 9/2020 | Jansson et al. | |
| 2005/0028208 | A1 | 2/2005 | Ellis et al. | |
| 2006/0019605 | A1 | 1/2006 | Shau | |
| 2007/0234048 | A1 | 10/2007 | Ziv | |
| 2008/0162435 | A1 | 7/2008 | Dooms et al. | |
| 2012/0143612 | A1 | 6/2012 | Yu et al. | |
| 2012/0214416 | A1 | 8/2012 | Kent et al. | |
| 2014/0149127 | A1 | 5/2014 | Stori | |
| 2014/0160880 | A1 | 6/2014 | King et al. | |
| 2014/0269208 | A1* | 9/2014 | Baym | G10K 11/26 367/138 |
| 2015/0121469 | A1 | 4/2015 | He | |
| 2015/0149186 | A1* | 5/2015 | Rao | G06F 16/955 704/500 |
| 2015/0365987 | A1 | 12/2015 | Weel | |
| 2017/0064345 | A1 | 3/2017 | Cai et al. | |
| 2017/0094464 | A1* | 3/2017 | Chu | G01S 1/00 |
| 2018/0103079 | A1 | 4/2018 | Lewis et al. | |
| 2018/0144750 | A1* | 5/2018 | Storti | H04B 11/00 |
| 2018/0167147 | A1* | 6/2018 | Almada | G10K 11/18 |
| 2018/0315424 | A1 | 11/2018 | Foerster et al. | |
| 2018/0332363 | A1* | 11/2018 | Panje | H04N 21/4126 |
| 2019/0099773 | A1 | 4/2019 | Torlei | |
| 2019/0116395 | A1* | 4/2019 | Kerdranvat | H04N 21/439 |
| 2020/0077158 | A1 | 3/2020 | Triplett et al. | |
| 2020/0105128 | A1 | 4/2020 | Frank | |
| 2020/0402516 | A1 | 12/2020 | Trim et al. | |
| 2021/0314722 | A1* | 10/2021 | Nguyen | H04S 7/303 |
| 2021/0318268 | A1 | 10/2021 | Bilen-Rosas et al. | |
| 2021/0329073 | A1 | 10/2021 | Sharma et al. | |
| 2021/0409888 | A1 | 12/2021 | Schevciw et al. | |

OTHER PUBLICATIONS

Eureopean Search Report for European Application No. 21154332.7 mailed May 12, 2021 (9 pages).
"Send data with sound," NFC Sound, accessed Mar. 27, 2020. Available at: nfcsound.com/home/.
"Connect music venues with sponsors and fans," NFC Sound, accessed Mar. 27, 2020. Available at : music.nfcsound.com.
Kiran et al., "Digital Watermarking: Potential Challenges and Issues," Int'l Journal of Computer Science Engineering and Technology (IJCSET), vol. 5, Issue 3, pp. 48-50 (Mar. 2015).
Jang et al., "Reliable Short-Distance Data-Transmission Mechanism Using Inaudible High-Frequency Sound," Division of Computer Engineering, Sungkyul University (2015).
European Communication pursuant to Article 94(3) EPC in European Application No. 21154332.7, mailed Nov. 17, 2022, 5 pages.

* cited by examiner

SYSTEMS AND METHODS FOR PROVIDING PLAY CONTEXT RECOGNITION USING ULTRASOUND CODES

REFERENCE TO RELATED APPLICATION

This is a continuation of U.S. patent application Ser. No. 17/001,028, filed Aug. 24, 2020, the entirety of which is hereby incorporated by reference.

TECHNICAL FIELD

Example aspects described herein generally relate to audio signal processing for signal classification, recognition and encoding/decoding auxiliary data channels in audio.

BACKGROUND

Play context is data associated with the presentation of media content by a media playback device, including, for example, a current position within a media stream that is being presented by the media playback device, a playlist associated with the media stream, or other previously-indicated related metadata.

Play context information associated with a media stream is typically communicated to the media playback device that is presenting that media stream by a media server providing the media stream, so that the information can be used by the media playback device, and/or displayed to a user. Typically, a context database at a media server is used to store a media device's current media state and synchronize that state between multiple media playback devices, in a cloud-like manner. Alternatively, the media state can be shared in a peer-to-peer manner, where each media playback device is aware of its own current media state which is then synchronized with other devices as needed. It would be desirable to be able to retrieve the play context from an unrelated media playback device without any reciprocal action.

There are no known mechanisms for communicating play context from a first media playback device that is presenting the stream to another, second media playback device, particularly without the second media playback device requesting it or otherwise being connected or associated with the first media playback device originally presenting the stream. Supplying play context from the media playback device that is presenting the stream to another, unrelated client device is thus one technical challenge. Yet another challenge involves supplying the play context in such an environment without degrading the playback of any stream being presented.

It would be desirable, therefore, to have a system that can provide play context that overcomes at least the aforementioned technical problems.

SUMMARY

The example embodiments described herein meet the above-identified needs by providing methods, systems and computer program products for providing play context recognition using ultrasound codes.

Aspects of the embodiments described herein are directed to mixing (e.g., combining or overlaying) a unique code imperceptibly with media content signals corresponding to media content items. An auxiliary data channel carrying the unique code is used apart from a media content channel carrying the media content item signals, where the unique code is used to identify the context of the media content items being played on a first media playback device for a second media playback device. The first media playback device is, for example, a sound system having an amplified speaker and the second media playback device is, for example, a mobile device such as a smartphone.

In an example embodiment, a method for retrieving play context is provided. The method performs transmitting, over a network, media content associated with the media content; causing a first media playback device to broadcast an ultrasound code, the ultrasound code corresponding to a play context code; receiving, over the network from a second media playback device, the play context code; and transmitting, over the network to the second media playback device, a play context based on the play context code.

In some embodiments, the method further includes the step of generating, by the first media playback device, the play context code. In some embodiments, the method further includes transmitting, by the first media playback device, a media state of the first media playback device in the ultrasound code. In some embodiments, the method further includes transmitting, over the network, a media state of the first media playback device. In some embodiments, the method further includes delivering the play context and the media state to the second media playback device. In an example embodiment, the media state includes a time stamp of the position of playback of a media content item currently playing at the first media playback device.

In some embodiments, the method includes generating, by the first media playback device, the play context code based on the first metadata payload, wherein the play context code is a binary number; and mapping, by the first media playback device, each bit of the play context code to an ultrasound frequency. In some embodiments, the method includes detecting, by the second media playback device the ultrasound code; and obtaining the play context code from the ultrasound code. In some embodiments, the method includes providing, by a third party media content server, supplemental media content based on the play context code.

In some embodiments, there is provided a system for supplying context to a media playback device. The system includes a memory and one or more processors operable to: transmit, over a network, media content associated with the media content; cause a first media playback device to broadcast an ultrasound code, the ultrasound code corresponding to a play context code; receive, over the network from a second media playback device, the play context code; and transmit to the second media playback device, a play context based on the play context code.

In some embodiments, the first media playback device is configured to generate the play context code. In some embodiments, the first media playback device is configured to transmit a media state of the first media playback device in the ultrasound code. In some embodiments, the one or more processors are further operable to transmit, over the network, a media state of the first media playback device. In some embodiments, the one or more processors are further operable to deliver the play context and the media state to the second media playback device. In an example embodiment, the media state includes a time stamp of the position of playback of a media content item currently playing at the first media playback device.

In some embodiments, the first media playback device is configured to: generate the play context code based on the first metadata payload, wherein the play context code is a binary number; and map each bit of the play context code to an ultrasound frequency. In some embodiments, wherein the second media playback device is configured to detect the ultrasound code and obtain the play context code from the ultrasound code. In some embodiments, the one or more processors are further operable to provide supplemental media content based on the play context code.

In another example embodiment there is provided, a non-transitory computer-readable medium having stored thereon one or more sequences of instructions for causing one or more processors to perform one or more of the methods described herein.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to methods, systems and computer program products for providing play context recognition using a code in an ultrasound audio signal referred to herein as an ultrasound code, which are now described herein in terms of an example media content streaming and delivery system that provides media content items to media playback devices, where a first media playback device has fixed speakers and the other media playback device(s) is/are mobile devices. The ultrasound codes are communicated in an auxiliary data channel without requiring significant bandwidth or degrading the playback of any media content item. The play context is provided in the form of media contexts, such as a pre-arranged list of media content items, an album identifier, and the like. In some embodiments, the play context includes the media state of the first media playback device.

This description is not intended to limit the application of the example embodiments presented herein. In fact, after reading the following description, it will be apparent to one skilled in the relevant art(s) how to implement the following example embodiments in alternative embodiments (e.g., where the first media playback device has a speaker that is mobile, where some of the components of the media content streaming and delivery system operate independently, where the devices are remote from each other but at least one mobile device can receive audio in the audio and ultrasound range, etc.). In addition, it will be apparent to one skilled in the relevant art how to implement the following invention in alternative embodiments, involving, for example, media content other than music, such as podcasts, video and the like.

In addition, not all of the components described herein are required to practice the invention, and variations in the arrangement and type of the components may be made without departing from the spirit or scope of the invention. As used herein, the terms "component" and "engine" are applied to describe a specific structure for performing specific associated functions, such as a special purpose computer as programmed to perform algorithms (e.g., processes) disclosed herein. The component (or engine) can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

Example System Architecture

Figure 1:
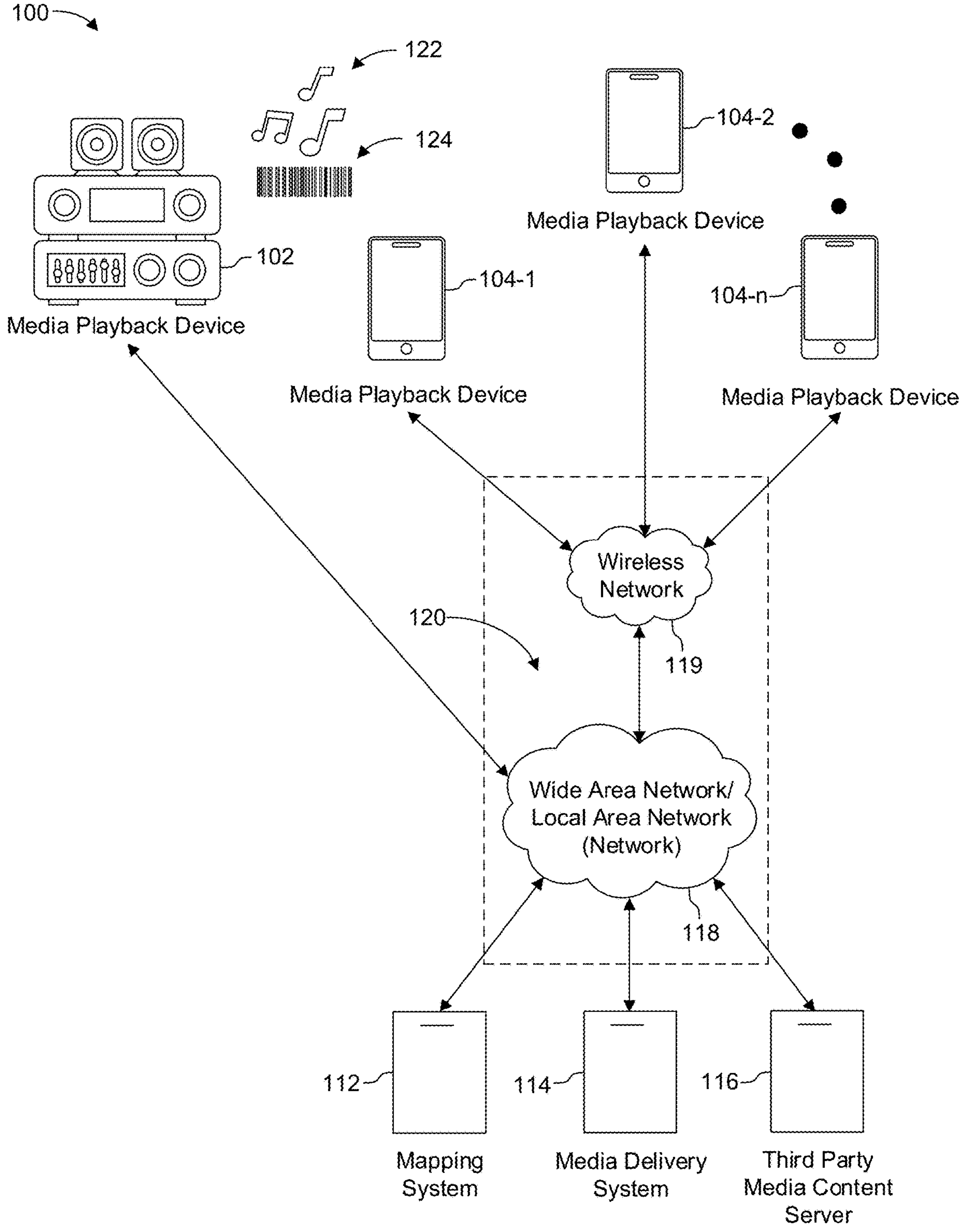
FIG. 1 illustrates an example media content streaming and delivery system for providing play context recognition using ultrasound codes in accordance with an embodiment of the present invention.

FIG. 1 illustrates an example media content streaming and delivery system 100 for providing play context recognition using ultrasound codes in accordance with an embodiment of the present invention. As shown in FIG. 1, system 100 includes a first media playback device 102 and one or more second media playback devices 104-1, 104-2, . . . , 104-*n*. For convenience, the second media playback devices 104-1, 104-2, . . . , 104-*n* are individually and collectively referred to herein as a second media playback device 104.

In some embodiments, the first media playback device 102 and the second media playback device 104 are loaded with the same application. In other embodiments only the functionality performed by the first media playback device 102 or second media playback device 104 is loaded onto the device, correspondingly. For example, one feature that is not required to be incorporated in the first media playback device 102 is a microphone. Thus, in some embodiments, the first media playback device 102 need not have loaded code for causing it to detect audio signals for purposes of determining play context according to the embodiments described herein.

As many media playback devices include similar types of hardware components, for simplicity, the same software can be loaded onto the memories of both the first media playback device 102 and the second media playback device 104, where some of the instructions (e.g., code for detecting audio signals) are not executed.

System 100 also includes a mapping system 112 and a media delivery system 114. In some example implementations, the media delivery system 114 includes the mapping system 112. In other example implementations, the media delivery system 114 is independent of the mapping system 112.

Examples of first media playback device 102, second media playback device 104 and media delivery system 114, in accordance with the example implementations of the present invention, are described below in more detail with reference to FIGS. 3 and 4.

In some embodiments, system 100 also includes a third party media content server 116 that operates to supply supplemental content to first media playback device 102 and/or second media playback device 104. Delivery of the supplemental content can be provided in a variety of ways.

For example, third party media content server 116 can host (e.g., store, supply, etc.) the supplemental content in which case the first media playback device 102 and second media playback device 104 can communicate directly with the third party media content server 116 to retrieve the supplemental content. In an example implementation, this is accomplished by providing the applicable media playback device (first media playback device 102 or second media playback device 104), for example, a media content item identifier, Uniform Resource Locator (URL), or Uniform Resource Indicator (URI) corresponding to a supplemental media content item (individually and collectively referred to as "media content item identifier"). In an example implementation, a media content item identifier is a sequence of different characters that identify a media file, playlist, or a certain type of logical or physical resource and can be used to identify albums, songs, podcasts, and the like.

In turn, the media playback device (e.g., first media playback device 102 or second media playback device 104) can make a request for the media content item(s) corresponding to the supplemental content using the media content item identifier.

In some embodiments, the supplemental media content is hosted by the media delivery system 114. In an example implementation, third party media content server 116 supplies one or more media content item identifiers to media delivery system 114 which in turn supplies the media content item identifier(s) to the media playback devices (e.g., first media playback device 102 or second media playback device 104). In some embodiments, media delivery system 114 also hosts (e.g., stores, supplies, etc.) the third party media content it obtains from third party media content server 116.

Media delivery system 114 can be configured to organize the timing and placement of the supplemental media content. In an example implementation, media delivery system 114 detects an activity of a user of the second media playback device 104 and inserts the supplemental media content item(s) at a predetermined time relative to the detection of the activity.

In some embodiments, third party media content server 116 is configured to communicate the media content item identifier(s) (e.g., the content identifiers, URL or URI corresponding to the supplemental media content item) to mapping system 112. In these example embodiments, mapping system 112 transmits to a media playback device (e.g., second media playback device) the content identifier(s) or link(s) to provide access to the supplemental media content.

System 100 also includes wide area networks/local area networks ("LANs/WANs")-(LAN/WAN network) 118 and wireless network 119.

LAN/WAN network 118 and wireless network 119 are referred to collectively and individually hereinafter as network 120. The network 120 is a data communication network that facilitates data communications between the first media playback device 102, the second media playback device 104, the mapping system 112, the media delivery system 114, and the third party media content server 116.

Generally, the media delivery system 114 operates to enable first media playback device 102 and second media playback device 104 to receive media content. A media content item is an item of media content including audio, video, and/or other types of media content, which may be stored in any format suitable for storing media content. Non-limiting examples of media content include music, video, games, books, text, podcasts, as well as webpage content, advertisements, professionally generated content (non-UGC content), search results, blogs, and/or any of a variety of user generated content for access by a client device such as a media playback device. In an example embodiment, the media delivery system 114 provides media contexts in the form of pre-arranged lists of media content items (e.g., playlists, albums, etc.) that are used to retrieve the media content items from the media delivery system 114 or a third party media content server 116.

As described above, in some embodiments, the media delivery system 114 further operates to enable first media playback device 102 and second media playback device 104 to receive supplemental content (e.g., additional media content item(s)) from third parties via, for example, third party media content server 116 which is played back in conjunction with the content provided by media delivery system 114. In some embodiments, the additional content provided by third party media content server 116 is played back between individual media content items provided by media delivery system 114. In other embodiments, the additional content provided by third party media content server 116 is played back in parallel with the content provided by media delivery system 114 (e.g., as an overlay media content item, displayed via a display if visual content, or presented through another output interface as applicable).

In some embodiments, media content items are grouped together in a pre-arranged list (e.g., a playlist) and played back on a media playback device (e.g., the first media playback device 102 or second media playback device 104) either sequentially, in a shuffled order or in another order selected by a user of the media playback device.

In some embodiments, the pre-arranged list is a content-based (CN) group of media content items referred to herein as a content-based list (or simply CN list). A CN list is associated with particular types of metadata such as genres, name of artist, album name, podcast name or movie name, the date of release, language or geographical boundaries.

In some embodiments, the pre-arranged list is a context-based (CX) group of media content items referred to herein as a context-based list (or simply CX list). A CX list is associated with a particular context such as an activity (e.g., workout, running, romantic dinner) or time-related event (e.g., Women's History Month, Lunar New Year, or just a day of the week).

System Data-Flows and Procedures

Figure 2:
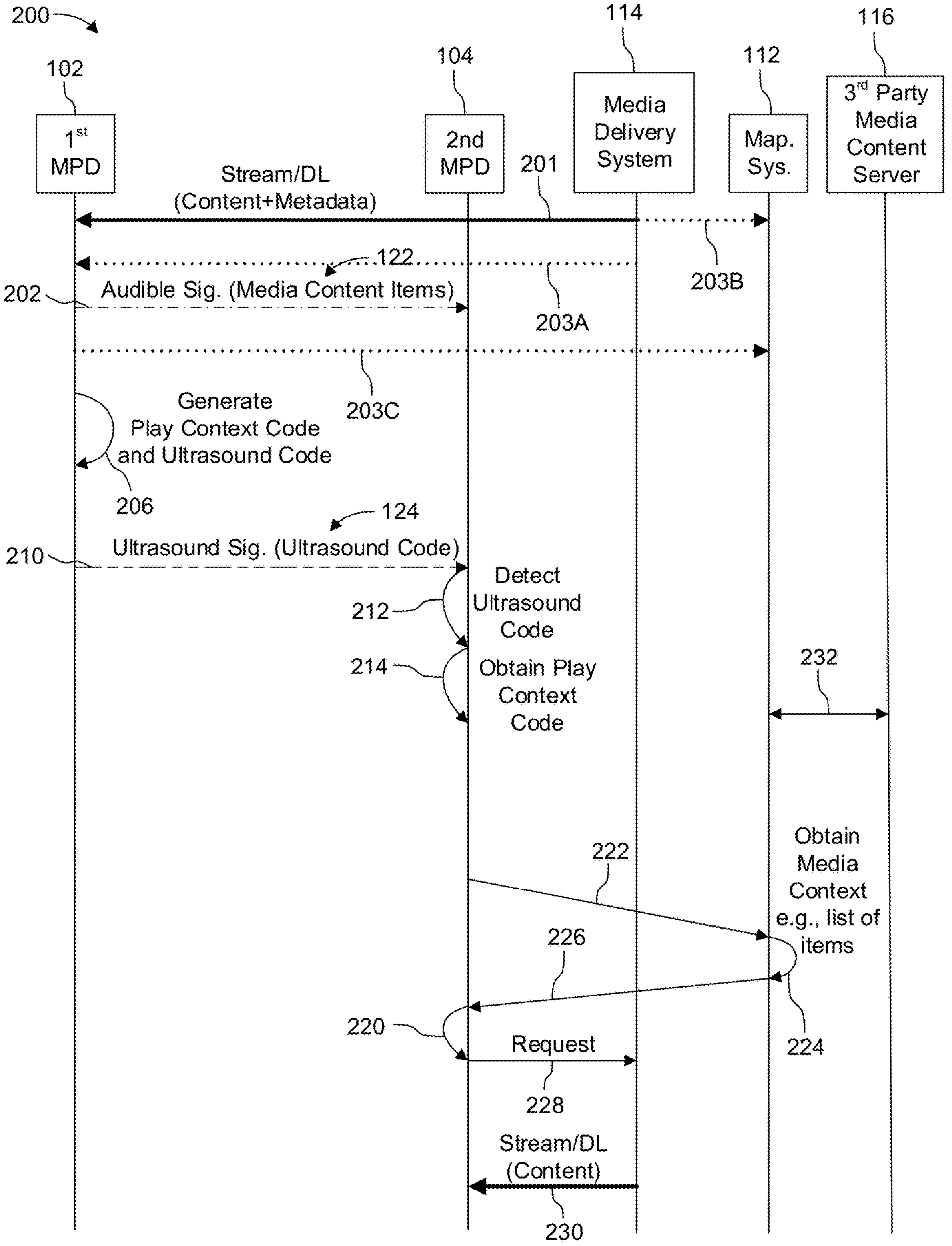
FIG. 2 depicts system data-flows and procedures for performing play context recognition using ultrasound codes in accordance with an embodiment of the present invention.

FIG. 2 depicts system data-flows and procedures 200 for performing play context recognition using ultrasound codes in accordance with an embodiment of the present invention. Referring also to FIG. 1, in some embodiments, the components used to implement procedure 200 include the first media playback device 102 (including a code processor 482 which is also described in connection with FIG. 3), one or more second media playback devices 104 (also including a code processor 482), mapping system 112, and the media delivery system 114. As explained above, not all of the components are required to practice the invention, and variations in the arrangement and type of the components may be made without departing from the spirit or scope of the invention. For example, the media delivery system 114 can include mapping system 112.

In an example embodiment, media content items and metadata (referred to as a first metadata payload) are delivered by a media delivery system 114 to the first media playback device 102, as shown at step 201. In turn, media content items 122 are played on the first media playback device 102, as shown at step 202. In some embodiments, the first media playback device outputs the media content items 122 in the audible frequency range (e.g., about 20 Hz to 20 kHz).

A unique code, referred to herein as an ultrasound code 124, is played imperceptibly in the ultrasound frequency range by the first media playback device 102, as shown in step 210. Audio signals in the ultrasound frequency range are not different from sounds in the audible frequency range in their physical properties, except that humans cannot hear them. In some embodiments, the ultrasound frequency range is about 20 kHz to 22 kHz. In some embodiments, the ultrasound frequency range is about 20 kHz-100 KHz.

In some embodiments, ultrasound code 124 is played concurrently with the playback of the media content items 122. Thus, the media content items 122 are played back in the audible frequency range while the ultrasound code 124 is communicated in the ultrasound frequency range.

The ultrasound code 124 represents at least a play context code. In other words, the play context code is contained within the ultrasound code 124.

In some embodiments, the code processor 482 (FIG. 3) of first media playback device 102 is configured to add additional coding to the ultrasound code 124 to enable error detection by the second media playback device 104. Wider frequency ranges allow for more information to be carried on a signal. Thus, the wider the frequency range, the more such error checking information can be communicated along with the play context code. Now known or future techniques for performing such error correction are contemplated to be within the scope of the invention. As explained in more detail below, the play context code enables the second media playback device 104 to obtain the play context of the first media playback device 102.

In some embodiments, first media playback device 102 communicates the mapping generated by code processor 482 to mapping system 112 over network 120.

To initially obtain the ultrasound code 124 for playback, in step 206, the first media playback device 102 processes the first metadata payload it has received from the media delivery system 114. In an example implementation, code processor 482 (FIG. 3) generates a play context code and then converts the play context code to ultrasound code 124. In an example implementation, the play context code is based on the first metadata payload.

Code processor 482 particularly provides a mechanism for transmitting data using inaudible high-frequency sounds. In an example implementation, the play context code is represented as a binary number. In turn, the code processor 482 maps the bits to specific frequencies in the ultrasound frequency range. In an example embodiment, the code processor 482 sends multiple bits simultaneously by mixing specific frequencies that are mapped to each bit.

In an example implementation, the unique frequency is pulsed for two (2) seconds every five (5) seconds. In another example implementation, the unique frequency is transmitted in the form of a constant pulse. The ultrasound code signal is communicated in the ultrasound frequency range in the form of a binary word (e.g., 24 bits long, where sixteen (16) bits are the play context code and the remaining eight (8) bits are a cyclic redundancy check (CRC) used for error detection.

In an alternative embodiment, the play context code is communicated by the media delivery system 114 to the first media playback device 102 over network 120. The play context code can be in the form of a string of numbers. In this alternative embodiment first media playback device 102 is configured to extract the play context code and communicate it to second media playback device 104.

A state of playback is the current position of the playlist and referred to as the media state. In an example implementation the media state includes a time stamp of the position of playback of a media content item currently playing at first media playback device 102. In some embodiments, the media state at the first media playback device 102 is communicated by the media delivery system 114. In an example implementation, the media state at the first media playback device 102 is provided by the media delivery system 114 in the first metadata payload. In another example implementation, the current media state is communicated by the media delivery system 114 independently of the first metadata payload, as shown in step 203A. In both these example implementations, the first media playback device 102 forwards the media state to the second media playback device 104 by including the media state in play context code.

In one embodiment, first media playback device 102 is configured to determine the media state itself by coding into the play context code the media context the first media playback device 102 is playing. In turn, the first media playback device 102 is further configured to communicate the media state it has determined to the second media playback device 104 in the play context code.

In another embodiment, the first media playback device 102 forwards the media state obtained from the media delivery system 114 to mapping system 112 via network 120, as shown in step 203C. In turn, second media playback device 104 retrieves the media state from mapping system 112. In an example implementation, this is accomplished by the second media playback device 104 requesting a play context using the play context code it has extracted from the ultrasound code 124. The mapping system 112 is configured to communicate the media state to the second media playback device 104 upon receiving the play content code. This can be in addition to the mapping system 112 communicating additional data such as play context (e.g., a pre-arranged list of media playback items).

In yet another embodiment, the state of playback is the current media state of the first media playback device 102 as provided by the media delivery system 114 to mapping system 112 as shown in step 203B. This is an alternative mechanism to communicating the media state directly to first media playback device 102, as described in connection with step 203A.

As described above, at step 210, first media playback device 102 communicates the ultrasound code 124 through its output device (e.g., speakers) in the ultrasound frequency range. At step 212, the second media playback device 104 detects the ultrasound code 124 that is communicated at the ultrasound frequency range. Upon detection, the second media playback device 104 extracts the play context code from the ultrasound code 124, as shown at step 214.

In some example embodiments, mapping system 112 stores a code database that is automatically updated to map play context codes to media content item identifiers. In some embodiments, mapping system 112 stores mappings associated with the play context of media playback devices (e.g., first media playback device 102).

In some embodiments, the first media playback device 102 transmits to mapping system 112 a mapping of its play context for storage in a code database of mapping system 112. For example, first media playback device 102 transmits to mapping system 112 a media content item identifier it is processing and the corresponding play context code it has generated via network 120.

In some embodiments media delivery system 114 can generate a play context code as described above in connection with the first media playback device 102. In an example implementation, media delivery system 114 can generate the play context code based on media content streamed to the first media playback device 102 by the media delivery system 114. In turn, media delivery system 114 transmits to mapping system 112 the mapping of a media content item identifier and play context code corresponding to the first media playback device 102 for storage in the code database of the mapping system 112.

After extracting the play context code from the ultrasound code 124 as described above in connection with step 214, in step 222, a code processor 482 (FIG. 3) of the second media playback device 104 transmits the play context code to mapping system 112, as shown in step 222.

In some embodiments, second media playback device 104 combines additional information with the play content code, such as play history, activity, environment, location, and the like. The communication of the play content code (and any additional information) from second media playback device 104 to mapping system 112 that occurs in step 222 is over a data network, network 120. This is in contrast to the mechanism by which ultrasound code 124 is communicated from first media playback device 102 to the second media playback device 104. The first media playback device 102 broadcasts ultrasound code 124 by outputting signals in the ultrasound frequency range, whereas second media playback device 104 communicates the code to mapping system 112 over a LAN or WAN. This mechanism provides a fast and efficient way to communicate play context of a first media playback device 102 to a second media playback device 104.

In some embodiments, it is possible to enable the first media playback device 102 to communicate the play context directly to the second media playback device 104 using an ultrasound code. In such embodiments, the ultrasound code is longer and may require additional error correction coding.

Upon receipt of the play content code via network 120, mapping system 112 processes the play content code, as shown in step 224. In one implementation, mapping system 112 maps the play content code to a media context corresponding to the play context of the first media playback device 102. In turn, mapping system 112 transmits to the second media playback device 104 via network 120 a second metadata payload including the play context, as shown in step 226.

Upon receipt of the second metadata payload in step 226, second media playback device 104 processes the second metadata payload to obtain the play context of the first media playback device 102 (e.g., a pre-arranged list of items), as shown in step 220.

In some embodiments, mapping system 112 supplies additional metadata about the media item(s) in the play context.

In turn, the flow proceeds to step 228 in which the second media playback device 104 issues a request to the media delivery system 114 for a particular media content item to be played using play context. Upon receipt of the request, media delivery system 114 delivers the requested media content item(s).

In turn, the second media playback device 104 issues a request to media delivery system 114 for a particular media content item to be played, as shown in step 228. In an example implementation, the request includes a track identifier from the pre-arranged list of items. In response, media delivery system 114 causes the requested media content item to be played through second media playback device 104, as shown in step 230.

In some embodiments, third party media content server 116 communicates with mapping system 112 to add a media content item identifier corresponding to a supplemental media contest item into the list of media items supplied by mapping system 112, as shown in step 232. In some embodiments, mapping system 112 requests third party media content server 116 to provide the supplemental media content item identifiers upon receiving a play context code from second media playback device 104.

In some embodiments, the first media playback device 102 converts the ultrasound code 124 into an ultrasound code signal and plays the ultrasound code signal separately from an audible media content signal carrying media content items 122. In some embodiments, the first media playback device 102 converts the ultrasound code into an ultrasound code signal and mixes (e.g., overlays, combines, etc.) the ultrasound code signal with a media content signal.

The ultrasound code and/or its mechanism of transmission from the first media playback device 102 can be designed in different ways depending on the application. For example in one embodiment, the ultrasound code is transmitted repeatedly at predefined intervals through the auxiliary data channel while the media content items are audibly played through the media content channel in any order (e.g., sequentially, shuffled, or any other order selected by a user).

In some embodiments, the two independent audio signals (e.g., a media content item signal containing a media content item 122 and a signal containing the play context code (i.e., the ultrasound code 124) are mixed together to form a mixed signal. The unique play context code is converted into an ultrasound code signal, where each bit of the code is represented by a different ultrasound frequency. The ultrasound code signal is mixed with the media content item signal, thereby forming a mixed signal. The mixed signal is output via the first media playback device 102 via a first communications channel between the first media playback device 102 and the second media playback device 104 in both the audible frequency range and ultrasound frequency range.

In some embodiments, the pre-arranged list is stored on a first database operable to store metadata including playlists (e.g., a playlist database) and the content items pointed to by the pre-arranged list are stored on a second database (media content item database), referred to sometimes as a media content database.

In some embodiments, the ultrasound code includes information sufficient to identify an account associated with the pre-arranged list.

In some embodiments, the media stream delivered by media delivery system 114 to first media playback device 102 in step 201 is synchronized with the playback of the media stream delivered by media delivery system 114 to the second media playback device 104 in step 230. This enables, for example, the second media playback device 104 to playback the same media stream from a remote location.

In some embodiments, first media playback device 102 and second media playback device 104 are not relatively close to each other. For example first media playback device 102 can output media content (including ultrasound code 124) from the speakers of an audio system in a room. The output of the speakers of the media playback device 102 can be received by a microphone of a video conferencing system. The second media playback device 104 can receive the output from the first media playback device 102 through the other end of the video conference line (e.g., from the speaker of a computer). In an example implementation, to achieve better quality sound, second media playback device 104 can detect the ultrasound signal containing the ultrasound code 124 from the audio of the video conferencing line and process the ultrasound code 124 as explained above to obtain a synchronized pre-arranged list of media content items. In turn, the second media playback device can playback the media stream directly from media delivery system.

Example System Implementation

Figure 3:
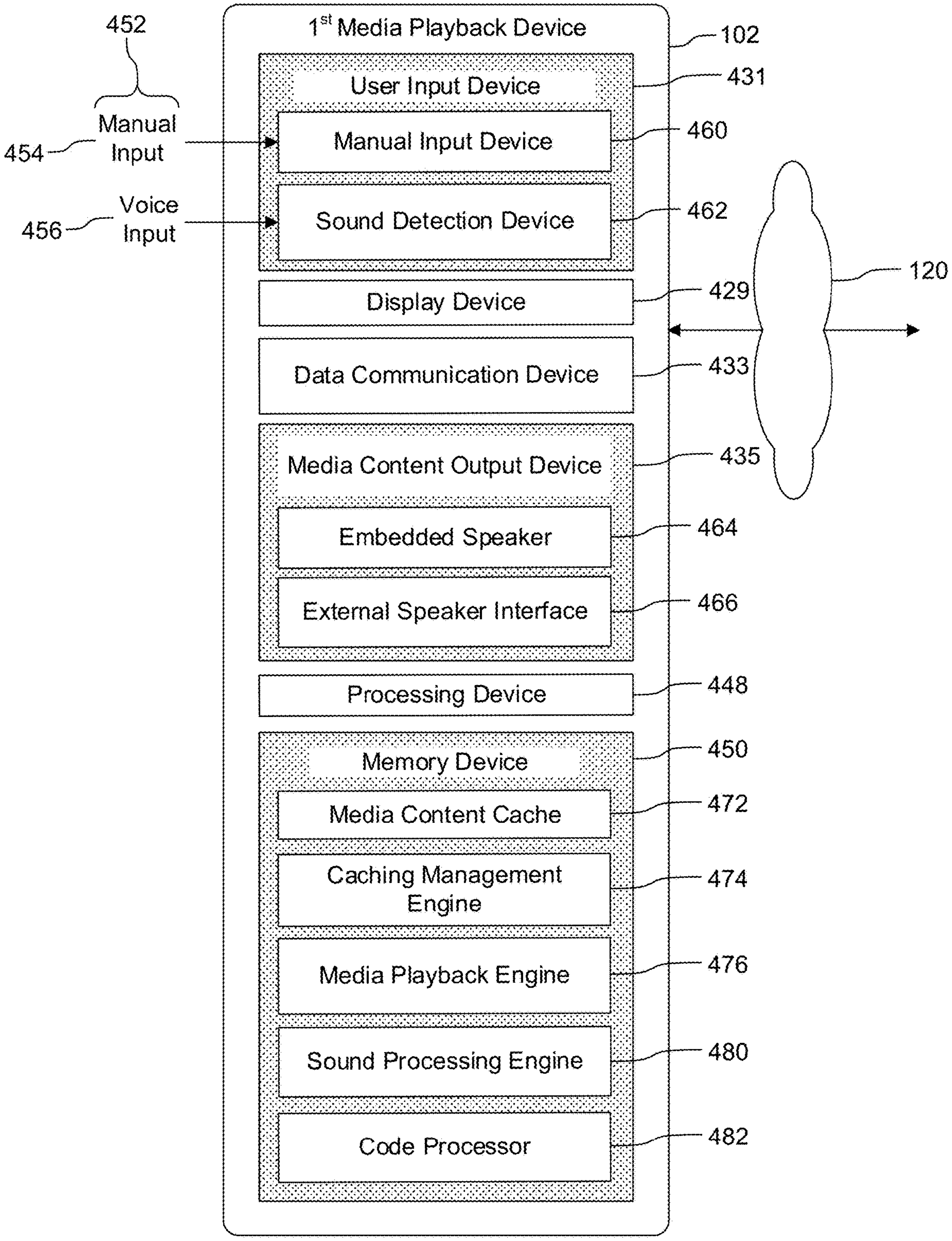
FIG. 3 illustrates an example media playback device for providing play context recognition using ultrasound codes in accordance with an embodiment of the present invention.
Figure 4:
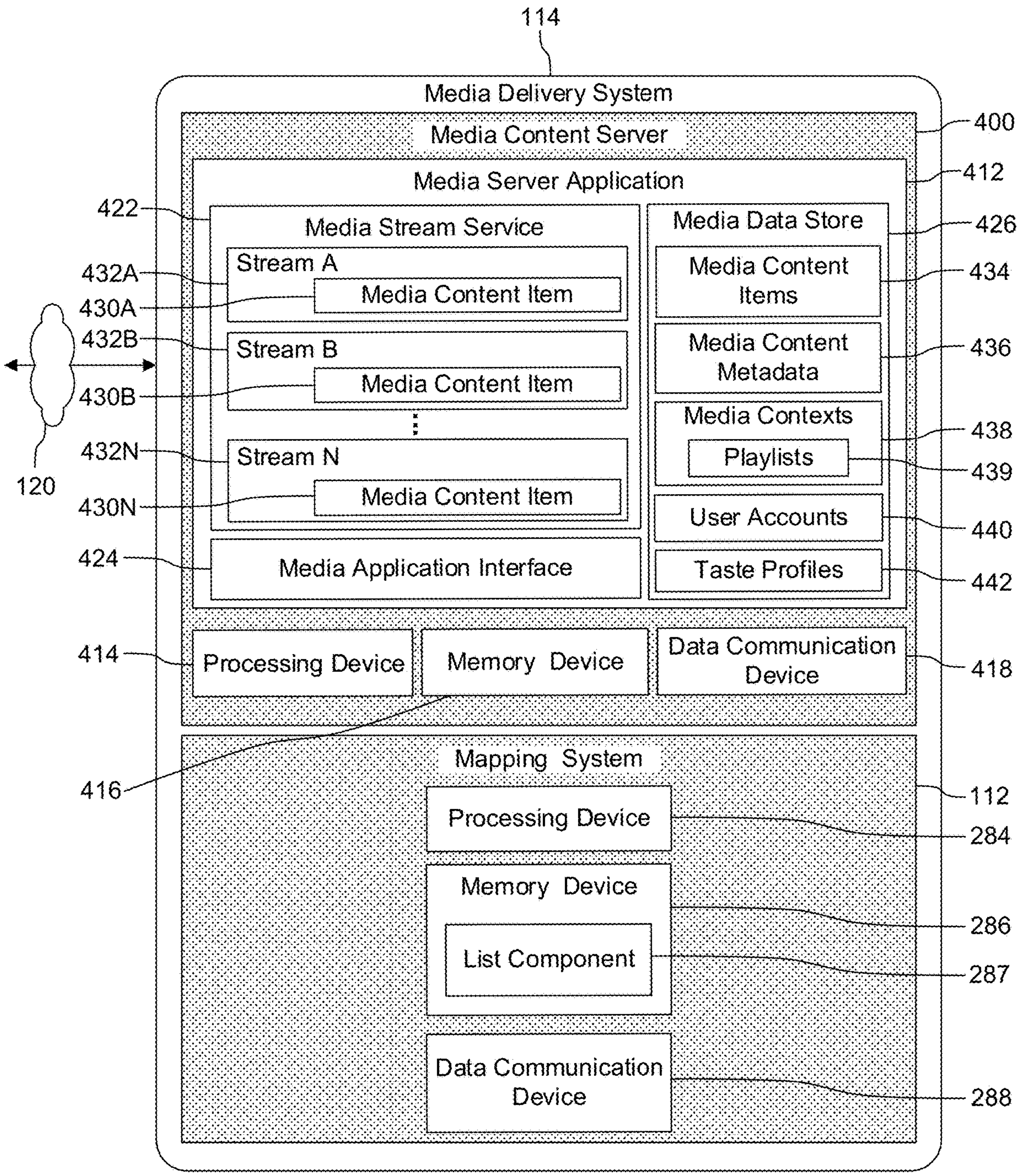
FIG. 4 illustrates an example media delivery system for providing play context recognition using ultrasound codes in accordance with an embodiment of the present invention.

FIGS. 3 and 4 are collectively a representative view of a media content streaming and delivery system in which some embodiments of the invention may be implemented. FIG. 3 illustrates an example first media playback device for providing play context recognition using ultrasound codes in accordance with an embodiment of the present invention. FIG. 4 illustrates an example media delivery system for providing play context recognition using ultrasound codes in accordance with an embodiment of the present invention.

FIG. 3 refers to a media playback device, such as first media playback device 102 or second media playback device 104. As such, when a component is implemented in both first media playback device 102 and second media playback device 104, for simplicity, first media playback device 102 and second media playback device 104 are individually and collectively referred to as simply "media playback device 102/104".

Referring to FIG. 4, the media delivery system 114 operates to provide media content and other data to one or more media playback devices, such as media playback device 102/104 via the network 120.

In this example implementation, mapping system 112 described above in connection with FIGS. 1 and 2 are incorporated in the media delivery system 114. However, it should be understood that these components can be independent systems.

In this document, the media content that is currently playing, queued to be played, or has been previously played can be represented as a first media content item. In addition, the media content that will be played after the first media content item is referred to as a second media content item. Further, the media content that will be played after the second media content item is referred to as a third media content item. The first media content item, the second media content item, and the third media content item can be of various types. In some embodiments, the first media content item and/or the second media content item can be media content items 430A, 430B, . . . 430N (collectively and/or individually sometimes referred to simply as media content item 430) or media content item 434. In still other embodiments, the first media content item, the second media content item and/or the third media content item can be of other types of media contexts 438. For example, the first media content item, the second media content item and/or the third media content item can be playlists 439.

Referring again to FIG. 3, in some embodiments, a user input 452 (e.g., a query) can be provided via a manual input 454. In other embodiments the user input 452 can be provided via a voice input 456. A voice input 456, can be a voice request received through a sound detection device (e.g., a microphone). As described herein, the voice request can be processed into a text query suitable for media content search. In other embodiments, the query can be a text that is typed using the media playback device 102/104 or another computing device.

Still referring to FIG. 3, in this example, the media playback device 102/104 includes a user input device 431, a display device 429, a data communication device 433, a media content output device 435, a processing device 448, and a memory device 450.

The media playback device 102/104 operates to play media content. For example, the media playback device 102/104 is configured to play media content that is provided (e.g., streamed or transmitted) by a system external to the first media playback device 102, such as the media delivery system 114, another system, or a peer device. In other examples, the media playback device 102/104 operates to play media content stored locally on the media playback device 102/104. In yet other examples, the media playback device 102/104 operates to play media content that is stored locally as well as media content provided by other systems.

In some embodiments, the media playback device 102/104 is a handheld or portable entertainment device, smart speaker, smartphone, tablet, watch, wearable device, or any other type of computing device capable of playing media content. In other embodiments, the media playback device 102/104 is a laptop computer, desktop computer, television, gaming console, set-top box, network appliance, Blue-ray™ or DVD player, media player, stereo, or radio, some examples of which are depicted in FIGS. 3 and 4.

The user input device 431 operates to receive a user input 452 from a user for controlling the media playback device 102/104. As illustrated, the user input 452 can include a manual input 454 and a voice input 456. In some embodiments, the user input device 431 includes a manual input device 460. In some embodiments the user input device 431 includes a sound detection device 462.

The manual input device 460 operates to receive the manual input 454 for controlling playback of media content via the media playback device 102/104. In some embodiments, the manual input device 460 includes one or more buttons, keys, touch levers, switches, and/or other mechanical input devices for receiving the manual input 454. For example, the manual input device 460 includes a text entry interface, such as a mechanical keyboard, a virtual keyboard, or a handwriting input device, which is configured to receive a text input, such as a text version of a user query. In addition, in some embodiments, the manual input 454 is received for managing various pieces of information transmitted via the media playback device 102/104 and/or controlling other functions or aspects associated with the media playback device 102/104.

The sound detection device 462 operates to detect and record sounds from proximate the media playback device 102/104. For example, the sound detection device 462 can detect sounds including the voice input 456. In some embodiments, the sound detection device 462 includes one or more acoustic sensors configured to detect sounds proximate the media playback device 102/104. For example, acoustic sensors of the sound detection device 462 include one or more microphones. Various types of microphones can be used for the sound detection device 462 of the media playback device 102/104.

In at least the case of second media playback device 104 of FIG. 4, sound detection device 462 operates to detect and record sounds in the ultrasound frequency range output from the first media playback device 102. This allows second media playback device 104 to detect and record the ultrasound code 124. The second media playback device 104 need only be in audible range of the output of first media playback device 102.

In some embodiments, the voice input 456 is a voice of a user (also referred to herein as an utterance) for controlling playback of media content via the media playback device 102/104. For example, the voice input 456 includes a voice version of a user query received from the sound detection device 462 of the media playback device 102/104. In addition, the voice input 456 is a voice of a user for managing various data transmitted via the media playback device 102/104 and/or controlling other functions or aspects associated with the media playback device 102/104.

In some embodiments, the sounds detected by the sound detection device 462 can be processed by the sound processing engine 480 of the media playback device 102/104 as described below.

The display device 429 operates to display information to a user. Examples of such information include media content playback information, notifications, and other information. In some embodiments, the display device 429 is configured as a touch sensitive display and includes the manual input device 460 of the user input device 431 for receiving the manual input 454 from a selector (e.g., a finger, stylus etc.) controlled by the user. In some embodiments, therefore, the display device 429 operates as both a display device and a user input device. The touch sensitive display device 429 operates to detect inputs based on one or both of touches and near-touches. In some embodiments, the display device 429 displays a graphical user interface for interacting with the media playback device 102/104. Other embodiments of the display device 429 do not include a touch sensitive display screen. Some embodiments include a display device and one or more separate user interface devices. Further, some embodiments do not include a display device.

The data communication device 433 operates to enable the media playback device 102/104 to communicate with one or more computing devices over one or more networks, such as the network 120. For example, the data communication device 433 is configured to communicate with the media delivery system 114 and receive media content from the media delivery system 114 at least partially via the network 120. The data communication device 433 can be a network interface of various types which connects the media playback device 102 to the network 120.

The network 120 typically includes a set of computing devices and communication links between the computing devices. The computing devices in the network 120 use the links to enable communication among the computing devices in the network. The network 120 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 120 includes various types of communication links. For example, the network 120 can include wired and/or wireless links, including cellular, Bluetooth®, Wi-Fi®, ultra-wideband (UWB), 802.11, ZigBee™, near field communication (NFC), an ultrasonic data transmission, and other types of wireless links. Furthermore, in various embodiments, the network 120 is implemented at various scales. For example, the network 120 can be implemented as one or more vehicle area networks, local area networks (LANs), metropolitan area networks, subnets, wide area networks (WAN) (such as the Internet), or can be implemented at another scale. Further, in some embodiments, the network 120 includes multiple networks, which may be of the same type or of multiple different types.

Examples of the data communication device 433 include wired network interfaces and wireless network interfaces. Wireless network interfaces include infrared, Bluetooth® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 435 operates to output media content. In some embodiments, the media content output device 435 generates the media output for the user. In some embodiments, the media content output device 435 includes one or more embedded speakers 464 which are incorporated in the media playback device 102/104.

Alternatively or in addition, some embodiments of the media playback device 102/104 include an external speaker interface 466 as an alternative output of media content. The external speaker interface 466 is configured to connect the media playback device 102/104 to another system having one or more speakers, such as headphones, a portable speaker, and a vehicle entertainment system, so that the media output is generated via the speakers of the other system external to the media playback device 102/104. Examples of the external speaker interface 466 include an audio output jack, a USB port, a Bluetooth® transmitter, a display panel, and a video output jack. Other embodiments are possible as well. For example, the external speaker interface 466 is configured to transmit a signal that can be used to reproduce an audio signal by a connected or paired device such as headphones or a speaker.

The processing device 448, in some embodiments, comprises one or more central processing units (CPU). In other embodiments, the processing device 448 additionally or alternatively includes one or more digital signal processors, field-programmable gate arrays, or other electronic circuits.

The memory device 450 typically includes at least some form of computer-readable media. The memory device 450 can include at least one data storage device. Computer readable media includes any available media that can be accessed by the media playback device 102/104. By way of example, computer-readable media is non-transitory and includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, Blu-ray™ discs, digital versatile discs or other optical storage, magnetic storage devices, or any other medium that can be used to store the desired information and that can be accessed by the media playback device 102/104. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 450 operates to store data and instructions. In some embodiments, the memory device 450 stores instructions for a media content cache 472, a caching management engine 474, a media playback engine 476, a sound processing engine 480, and a code processor 482.

Some embodiments of the memory device 450 include the media content cache 472. The media content cache 472 stores media content items, such as media content items that have been received from the media delivery system 114. The media content items stored in the media content cache 472 may be stored in an encrypted or unencrypted format. In some embodiments, the media content cache 472 also stores metadata about media content items such as title, artist name, album name, length, genre, mood, era, etc. The media content cache 472 can further store playback information about the media content items and/or other information associated with the media content items.

The caching management engine 474 is configured to receive and cache media content in the media content cache 472 and manage the media content stored in the media content cache 472. In some embodiments, when media content is streamed from the media delivery system 114, the caching management engine 474 operates to cache at least a portion of the media content into the media content cache 472. In other embodiments, the caching management engine 474 operates to cache at least a portion of media content into the media content cache 472 while online so that the cached media content is retrieved for playback while the media playback device 102/104 is offline.

The media playback engine 476 operates to play media content to a user. As described herein, the media playback engine 476 is configured to communicate with the media delivery system 114 to receive one or more media content items (e.g., through a media stream 432). In other embodiments, the media playback engine 476 is configured to play media content that is locally stored in the media playback device 102/104.

In some embodiments, the media playback engine 476 operates to retrieve one or more media content items that are either locally stored in the media playback device 102/104 or remotely stored in the media delivery system 114. In some embodiments, the media playback engine 476 is configured to send a request to the media delivery system 114 for media content items and receive information about such media content items for playback.

The sound processing engine 480 is configured to receive sound signals obtained from the sound detection device 462 and process the sound signals to identify different sources of the sounds received via the sound detection device 462. In some embodiments, the sound processing engine 480 operates to filter the voice input 456 (e.g., a voice request of a user query) from noises included in the detected sounds. Various noise cancellation technologies, such as active noise control or cancelling technologies or passive noise control or cancelling technologies, can be used to filter the voice input from ambient noise. In examples, the sound processing engine 480 filters out omni-directional noise and preserves directional noise (e.g., an audio input difference between two microphones) in audio input.

In other embodiments, the sound processing engine 480 operates to process the received sound signals to identify the sources of particular sounds of the sound signals, such as people's nearby conversation, the sound of equipment or components nearby or via a conferencing system (e.g., an engine, weight machines in a gym, and the like) or other ambient sounds associated therewith.

In some embodiments, the sound processing engine 480 at least partially operates to analyze a recording of sounds captured using the sound detection device 462, using speech recognition technology to identify terms spoken by the user, audio signal processing technology to filter audio signals such as ultrasound signals, and the like. In addition or alternatively, other computing devices, such as the media delivery system 114 can cooperate with the media playback device 102/104 for such analysis.

Additionally or alternatively, the sound processing engine 480 may determine various sound properties about the sounds proximate the media playback device 102/104 such as volume, dominant frequency or frequencies, etc. These sound properties may be used to make inferences about the environment proximate to the media playback device 102/104.

Generally, the code processor 482 in the first media playback device 102 is configured to supply to a second media playback device 104 a play context code corresponding to the play context of the first media playback device 102 and the code processor 482 in the second media playback device 104 is configured to supply the play context code it has received from the first media playback device 102 to a mapping system 112. The code processor 482 in the second media playback device 104 is also configured to process a second payload of metadata received from the mapping system 112 in response to supplying the mapping system 112 the play context code.

A play context code as used herein is a set of characters or character strings that can be mapped onto one or more elements of a set of data. The play context code is used to retrieve a play context.

In some example embodiments, media playback device 102 stores a code database that is created to map a media content item identifier corresponding to the first media playback device 102 to a play context code.

In some example embodiments, the play context code is a compressed version of a media context identifier associated with the first media playback device 102. Now or future known techniques for providing identifiers (e.g., 16 bits) are contemplated.

In one example, the play context is in the form of a pre-arranged list of media content identifiers (e.g., a CN list or CX list). The code processor 482 is also configured to communicate a play context code over a network (e.g., network 120) to obtain the play context.

In some embodiments, the payload of metadata includes a play context code for a CN list or CX list. When the play context code is for a content-based (CN) list it is referred to as a content identifier CN ID and when the play context code is for a context-based (CX) list it is referred to as a context identifier CX ID. In some embodiments, the payload of metadata includes additional information such as an account identifier corresponding to a user. In some embodiments, the metadata payload includes context information (e.g., a type of activity, time-related event information, etc.).

The code processor 482 maps metadata payloads and codes (i.e., mappings of metadata payloads to codes and mappings of codes to metadata payloads) in a database that is accessible by first media playback device 102 and second media playback device 104. In its simplest embodiment, the code processor 482 maps codes to the metadata payloads.

Referring to FIG. 4, the media delivery system 114 includes a media content server 400 and a mapping system 112. As explained above, not all of the components described herein are required to practice the invention, and variations in the arrangement and type of the components may be made without departing from the spirit or scope of the invention, for example by incorporating the mapping system 112 or other components depicted in FIG. 4 remote from the media delivery system 114 (e.g., in communication via network 120).

The media delivery system 114 comprises one or more computing devices and provides media content to the media playback device 102/104 and, in some embodiments, other media playback devices as well. In addition, the media delivery system 114 interacts with the media playback device 102/104 to provide the media playback device 102/104 with various functionalities.

In at least some embodiments, the media content server 400 and the mapping system 112 are provided by separate computing devices. In other embodiments, the media content server 400 and the mapping system 112 are provided by the same computing device(s). Further, in some embodiments, at least one of the media content server 400 and the mapping system 112 is provided by multiple computing devices. For example, the media content server 400 and the mapping system 112 may be provided by multiple redundant servers located in multiple geographic locations.

Although FIG. 4 shows a single media content server 400 and a single mapping system 112, some embodiments include multiple media content servers and multiple mapping systems. In these embodiments, each of the multiple media content servers and multiple mapping systems may be identical or similar to the media content server 400 and mapping system 112 respectively, as described herein, and may provide similar functionality with, for example, greater capacity and redundancy and/or services from multiple geographic locations. Alternatively, in these embodiments, some of the multiple media content servers, multiple code systems and/or multiple mapping systems may perform specialized functions to provide specialized services. Various combinations thereof are possible as well.

The media content server 400 transmits stream media to media playback devices such as the media playback device 102/104. In some embodiments, the media content server 400 includes a media server application 412, a processing device 414, a memory device 416, and a data communication device 418. The processing device 414 and the memory device 416 may be similar to the processing device 448 and the memory device 450, respectively, which have each been previously described. Therefore, the description of the processing device 414 and the memory device 416 are omitted for brevity purposes.

The data communication device 418 operates to communicate with other computing devices over one or more networks, such as the network 120. Examples of the data communication device 418 include one or more wired network interfaces and wireless network interfaces. Examples of such wireless network interfaces of the data communication device 418 include wireless wide area network (WWAN) interfaces (including cellular networks) and wireless local area network (WLANs) interfaces. In other examples, other types of wireless interfaces can be used for the data communication device 418.

In some embodiments, the media server application 412 is configured to stream media content, such as music or other audio, video, or other suitable forms of media content. The media server application 412 includes a media stream service 422, a media application interface 424, and a media data store 426. The media stream service 422 operates to buffer media content, such as media content items 430A, 430B, and 430N (collectively 430), for streaming to one or more media streams 432A, 432B, and 432N (collectively 432).

The media application interface 424 can receive requests or other communication from media playback devices or other systems, such as the media playback device 102/104, to retrieve media content items from the media content server 400. For example, in FIG. 4, the media application interface 424 receives communication from the media playback device 102/104 to receive media content from the media content server 400.

In some embodiments, the media data store 426 stores media content items 434, media content metadata 436, media contexts 438, user accounts 440, and taste profiles 442. The media data store 426 may comprise one or more databases and file systems. Other embodiments are possible as well.

As described herein, the media content items 434 (including the media content items 430) may be audio, video, or any other type of media content, which may be stored in any format for storing media content.

The media content metadata 436 provides various information (also referred to herein as attribute(s)) associated with the media content items 434. In addition or alternatively, the media content metadata 436 provides various information associated with the media contexts 438. In some embodiments, the media content metadata 436 includes one or more of title, artist name, album name, length, genre, mood, era, etc.

In some embodiments, the media content metadata 436 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding term would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 436, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

As described above, the media contexts 438 can include playlists 439. The playlists 439 are used to identify one or more of the media content items 434. In some embodiments, the playlists 439 identify a group of the media content items 434 in a particular order. In other embodiments, the playlists 439 merely identify a group of the media content items 434 without specifying a particular order. Some, but not necessarily all, of the media content items 434 included in a particular one of the playlists 439 are associated with a common characteristic such as a common genre, mood, or era.

In some embodiments, a user can listen to media content items in a playlist 439 by selecting the playlist 439 via a media playback device, such as the media playback device 102. The media playback device then operates to communicate with the media delivery system 114 so that the media delivery system 114 retrieves the media content items identified by the playlist 439 and transmits data for the media content items to the media playback device for playback.

In some embodiments, the playlist 439 includes one or more playlist descriptions. The playlist descriptions include information associated with the playlist 439. The playlist descriptions can include a playlist title. In some embodiments, the playlist title can be provided by a user using the media playback device 102. In other embodiments, the playlist title can be provided by a media content provider (or a media-streaming service provider). In yet other embodiments, the playlist title can be automatically generated.

Other examples of playlist descriptions include a descriptive text. The descriptive text can be provided by the user and/or the media content provider, which is to represent the corresponding playlist 439. In other embodiments, the descriptive text of the playlist description can be obtained from one or more other sources. Such other sources can include expert opinion (e.g., music reviews or classification of music into genres), user opinion (e.g., reviews through websites, chatrooms, blogs, surveys, and the like), statistics (e.g., sales data), shared collections, lists of favorite playlists, and any text information that may be used to describe, rank, or interpret the playlist or music associated with the playlist. In some embodiments, the playlist descriptions can also be generated by a community of listeners and automatically retrieved from Internet sites, chatrooms, blogs, and the like.

In some embodiments, the playlist descriptions can take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding term would be used to describe the associated track, album or artist. Each term of the description vector indicates the probability that a corresponding term would be used to describe the associated track, album or artist.

In some embodiments, the playlist 439 includes a pre-arranged list of media content item identifications (IDs). The pre-arranged list of media content item identifications includes one or more media content item identifications that refer to respective media content items 434. Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 436, which can further include other attributes of the media content item, such as album name, length, genre, mood, era, etc. as described herein.

At least some of the playlists 439 may include user-created playlists. For example, a user of a media streaming service provided by media delivery system 114 can create a playlist 439 and edit the playlist 439 by adding, removing, and rearranging media content items in the playlist 439. A playlist 439 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 114 operates to generate a list of media content items recommended for the particular user or the particular group of users. In some embodiments, such recommended media content items can be selected based at least on the taste profiles 442 as described herein. Other information or factors can be used to determine the recommended media content items.

In addition or alternatively, at least some of the playlists 439 are created by a media streaming service provider. For example, such provider-created playlists can be automatically created by the media delivery system 114. In some embodiments, a provider-created playlist can be customized to a particular user or a particular group of users. By way of example, a playlist for a particular user can be automatically created by the media delivery system 114 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 440 are used to identify users of a media streaming service provided by the media delivery system 114. In some embodiments, a user account 440 allows a user to authenticate to the media delivery system 114 and enable the user to access resources (e.g., media content items, playlists, etc.) provided by the media delivery system 114. In some embodiments, the user can use different devices to log into the user account and access data associated with the user account in the media delivery system 114. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 442 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 442 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 442 can include other information. For example, the taste profiles 442 can include libraries and/or playlists of media content items associated with the user. The taste profiles 442 can also include information about the user's relationships with other users (e.g., associations between users that are stored by the media delivery system 114 or on a separate social media site).

The taste profiles 442 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 442 can represent a single user or multiple users. Conversely, a single user or entity can have multiple taste profiles 442. For example, one taste profile can be generated in connection with a user's media content play activity, whereas another separate taste profile can be generated for the same user based on the user's selection of media content items and/or artists for a playlist.

In some embodiments, memory device 450 stores code processor 482 that provides instructions to processing device 448, which when executed by processing device 448, cause the processing device (and hence the code processor 482) to match a metadata payload to one or more codes used to form the play context code. Memory device 450 further stores instructions that when executed by processing device 448 cause processing device 448 (and hence code processor 482) in the first media playback device 102 to convert the play content code into an ultrasound code and transmit the ultrasound code to at least one media playback device, such as second media playback device 104.

Memory device 450 further stores instructions that when executed by processing device 448 cause processing device 448 (and hence code processor 482) in the second media playback device 104 to extract the play content code from the ultrasound code.

Referring still to FIG. 4, mapping system 112 operates to provide a play context based on a current media state of a media playback device. The current media state of a media playback device, in some embodiments is supplied by a media delivery system, such as media delivery system 114. In some embodiments, the state of the media playback device is provided by a media playback device. In an example implementation, a media playback device extracts a play context code from a metadata payload and communicates the play content code to mapping system 112. In return, the mapping system 112 provides a list of items based on the play content code.

In some embodiments, mapping system 112 includes a processing device 284, a memory device 286, and a data communication device 288. The memory device 286 includes a list component 287 that provides instructions to processing device 284, which when executed by processing device 284 cause the processing device (and hence mapping system 112) to obtain a list of items. Upon obtaining the list of items, processing device 284 (and hence mapping system 112) transmits the list of items to a media playback device. The processing device 284, the memory device 286, and the data communication device 288 of the mapping system may be similar to the processing device 414, the memory device 416, and the data communication device 418, respectively, which have each been previously described. As explained above, in some embodiments, the list of items is obtained based on a media state of a media playback device. In some embodiments, the list of items is obtained based on a context (CX) identifier.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Figure 5:
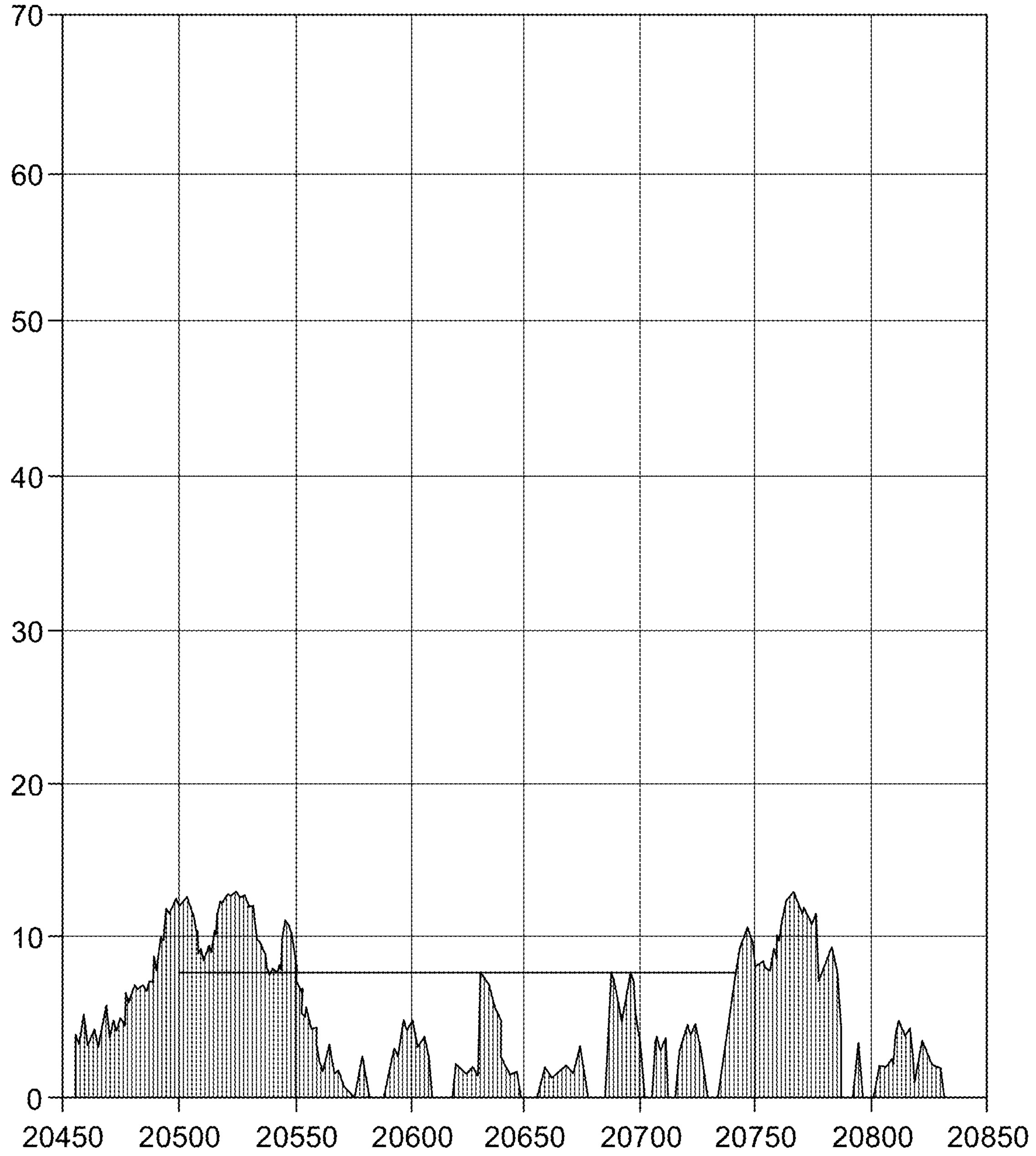
FIG. 5 illustrates an example audio signal frequency spectrum showing signals in the ultrasound frequency range that are transmitted by the first media playback device and detected by the second media playback device in accordance with an embodiment of the present invention.
Figure 6:
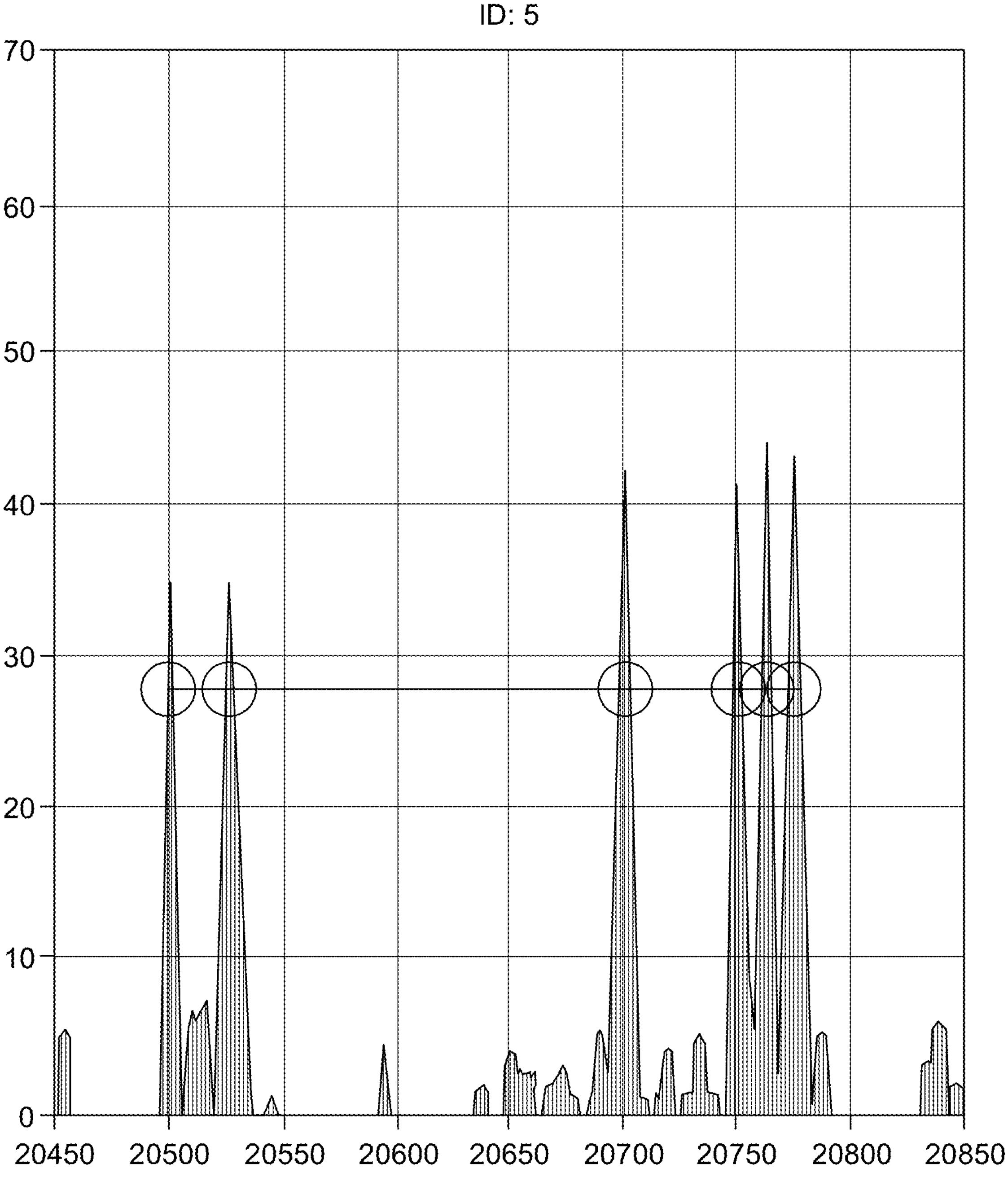
FIG. 6 illustrates an example audio signal frequency spectrum showing ultrasound signals representing an ultrasound code being transmitted by the first media playback device and detected by the second media playback device in accordance with an embodiment of the present invention.

FIG. 5 illustrates an example audio signal frequency spectrum showing signals in the ultrasound frequency range that are transmitted by the first media playback device and detected by the second media playback device in accordance with an embodiment of the present invention. As shown in FIG. 6, the signals of the audio signal in the ultrasound frequency range are relatively low and not yet above a predetermined threshold. In an example embodiment, the ultrasound code signals are in the ultrasound frequency range, for example at frequencies approximately around 20,500 Hz, which is filtered out by some speakers and microphone. In some embodiments, each bit is spaced approximately 12.5 Hz apart after approximately 20,500 Hz. In some embodiments, other frequencies over 20,000 Hz can be used, so long as such frequency can be produced by the first media playback device 102 and detected by the second media playback device 104. Similarly, the frequency spacing can be narrower or wider.

FIG. 6 illustrates an example audio signal frequency spectrum showing ultrasound signals representing an ultrasound code being transmitted by the first media playback device and detected by the second media playback device in accordance with an embodiment of the present invention. As shown in this snapshot of the audio signal frequency spectrum, the individual bits are more clearly visible and detectable. That is, the ultrasound code is above a predetermined threshold and therefore detectable by the second media playback device.

It should be understood that the FIGS. 1-6 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection, the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method comprising:

storing a mapping between a play context code and a play context associated with a first media playback device;

causing the first media playback device to broadcast one or more signals comprising (i) an ultrasound code in at least one ultrasound frequency, the ultrasound code corresponding with the play context code and (ii) media content in an audible frequency range;

receiving, over a network from a second media playback device operating independently of the first media playback device, the play context code, based on the second playback device having received the ultrasound code in the broadcast from the first media playback device; and based on the play context code received from the second media playback device and based on the stored mapping, transmitting, over the network to the second media playback device, the play context associated with the first media playback device, wherein the play context comprises at least one item selected from the group consisting of (i) a playlist currently being played by the first media playback device and (ii) a position in the playlist currently being played by the first media playback device.

2. The method of claim 1, wherein broadcasting the one or more signals comprises broadcasting a mixed signal comprising (i) the ultrasound code in the at least one ultrasound frequency and (ii) the media content in the audible frequency range.

3. The method of claim 1, wherein broadcasting the one or more signals comprises concurrently broadcasting (i) a first signal comprising the ultrasound code in the at least one ultrasound frequency and (ii) a second signal comprising the media content in the audible frequency range.

4. The method of claim 1, wherein the ultrasound code indicates a media state of the first media playback device.

5. The method of claim 1, wherein the play context comprises a media state of the first media playback device.

6. The method of claim 1, wherein the play context code is a binary number and is based on first metadata payload associated with the media content, wherein broadcasting the one or more signals comprising the ultrasound code on at least one ultrasound frequency comprises mapping bits of the play context code to ultrasound frequencies.

7. The method of claim 1, wherein the play context comprises a current position in the playlist being played out by the first media playback device.

8. The method of claim 1, wherein the play context comprises the playlist currently being played by the first media playback device.

9. The method of claim 1, wherein the play context comprises an identification of media content being played by the first media playback device.

10. The method of claim 1, further comprising:

causing a media content server to provide supplemental media content based on the play context code.

11. The method of claim 1, further comprising:

synchronizing media playback at the second media playback device with media playback at the first media playback device.

12. The method of claim 1, wherein the play context comprises at least one item selected from the group consisting of a content-based list and a context-based list.

13. A system comprising:

one or more processors;

non-transitory data storage, wherein the non-transitory data storage stores a mapping between a play context code and a play context associated with a first media playback device; and program instructions stored in the non-transitory data storage and executable by the one or more processors to carry out operations including:

causing the first media playback device to broadcast one or more signals comprising (i) an ultrasound code in at least one ultrasound frequency, the ultrasound code corresponding with the play context code and (ii) media content in an audible frequency range, receiving, over a network from a second media playback device operating independently of the first media playback device, the play context code, based on the second playback device having received the ultrasound code in the broadcast from the first media playback device, and based on the play context code received from the second media playback device and based on the stored mapping, transmitting, over the network to the second media playback device, the play context associated with the first media playback device, wherein the play context comprises at least one item selected from the group consisting of (i) a playlist currently being played by the first media playback device and (ii) a position in the playlist currently being played by the first media playback device.

14. The system of claim 13, wherein broadcasting the one or more signals comprises broadcasting a mixed signal comprising (i) the ultrasound code in the at least one ultrasound frequency and (ii) the media content in the audible frequency range.

15. The system of claim 13, wherein broadcasting the one or more signals comprises concurrently broadcasting (i) a first signal comprising the ultrasound code in the at least one ultrasound frequency and (ii) a second signal comprising the media content in the audible frequency range.

16. The system of claim 13, wherein the ultrasound code indicates a media state of the first media playback device.

17. The system of claim 13, wherein the play context comprises a media state of the first media playback device.

18. The method of claim 1, wherein the play context code is a binary number and is based on first metadata payload associated with the media content, wherein broadcasting the one or more signals comprising the ultrasound code on at least one ultrasound frequency comprises mapping bits of the play context code to ultrasound frequencies.

19. The method of claim 1, wherein the play context comprises a current position in the playlist being played out by the first media playback device.

20. Non-transitory data storage having stored thereon program instructions executable by one or more processors to carry out operations including:

causing a first media playback device to broadcast one or more signals comprising (i) an ultrasound code in at least one ultrasound frequency, the ultrasound code corresponding with a play context code mapped to play context associated with the first media playback device and (ii) media content in an audible frequency range;

receiving, over a network from a second media playback device operating independently of the first media playback device, the play context code, based on the second playback device having received the ultrasound code in the broadcast from the first media playback device; and based on the play context code received from the second media playback device and based on the stored mapping, transmitting, over the network to the second media playback device, the play context associated with the first media playback device, wherein the play context comprises at least one item selected from the group consisting of (i) a playlist currently being played by the first media playback device and (ii) a position in the playlist currently being played by the first media playback device.

* * * * *